Patented Apr. 12, 1932

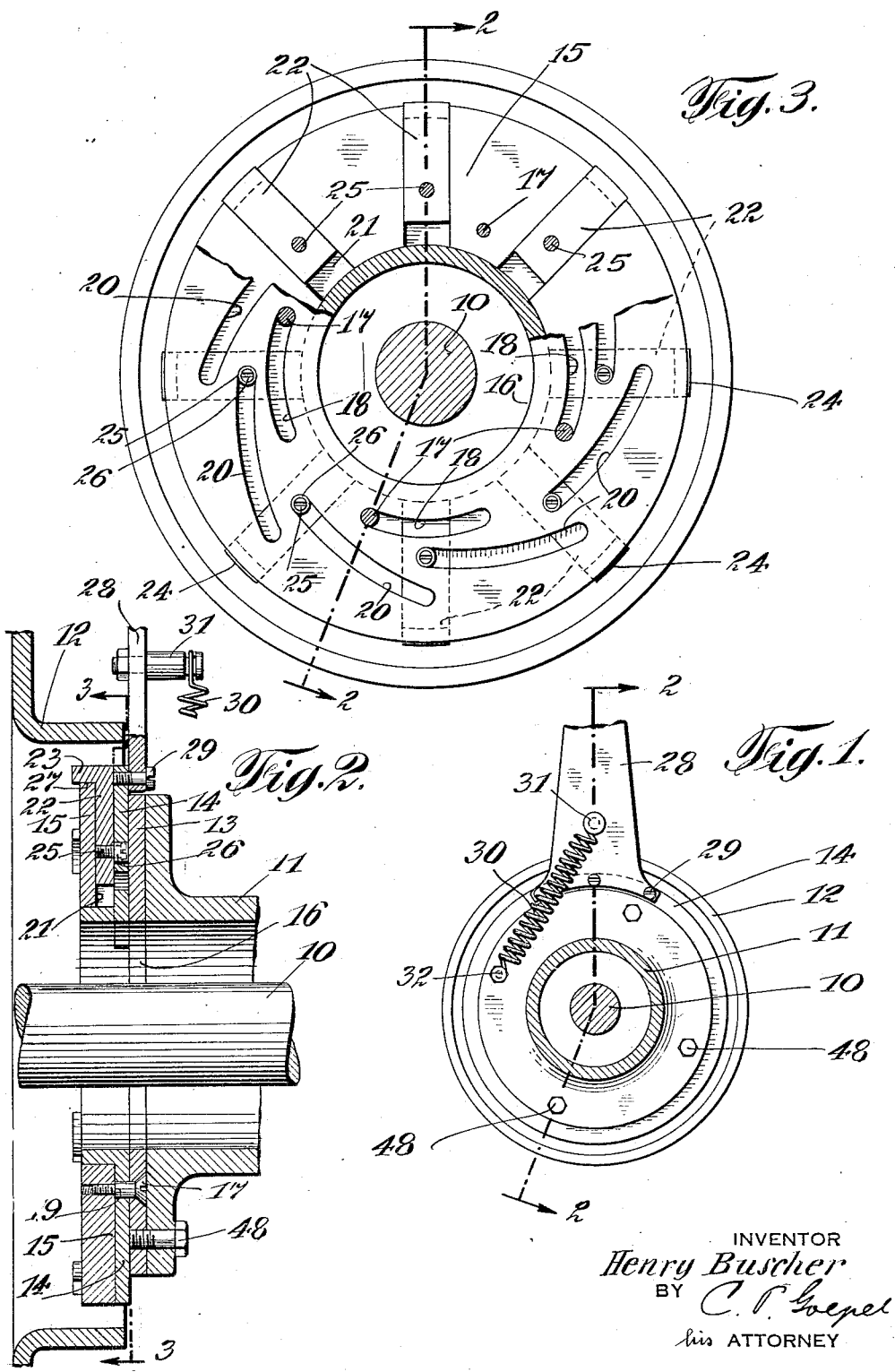

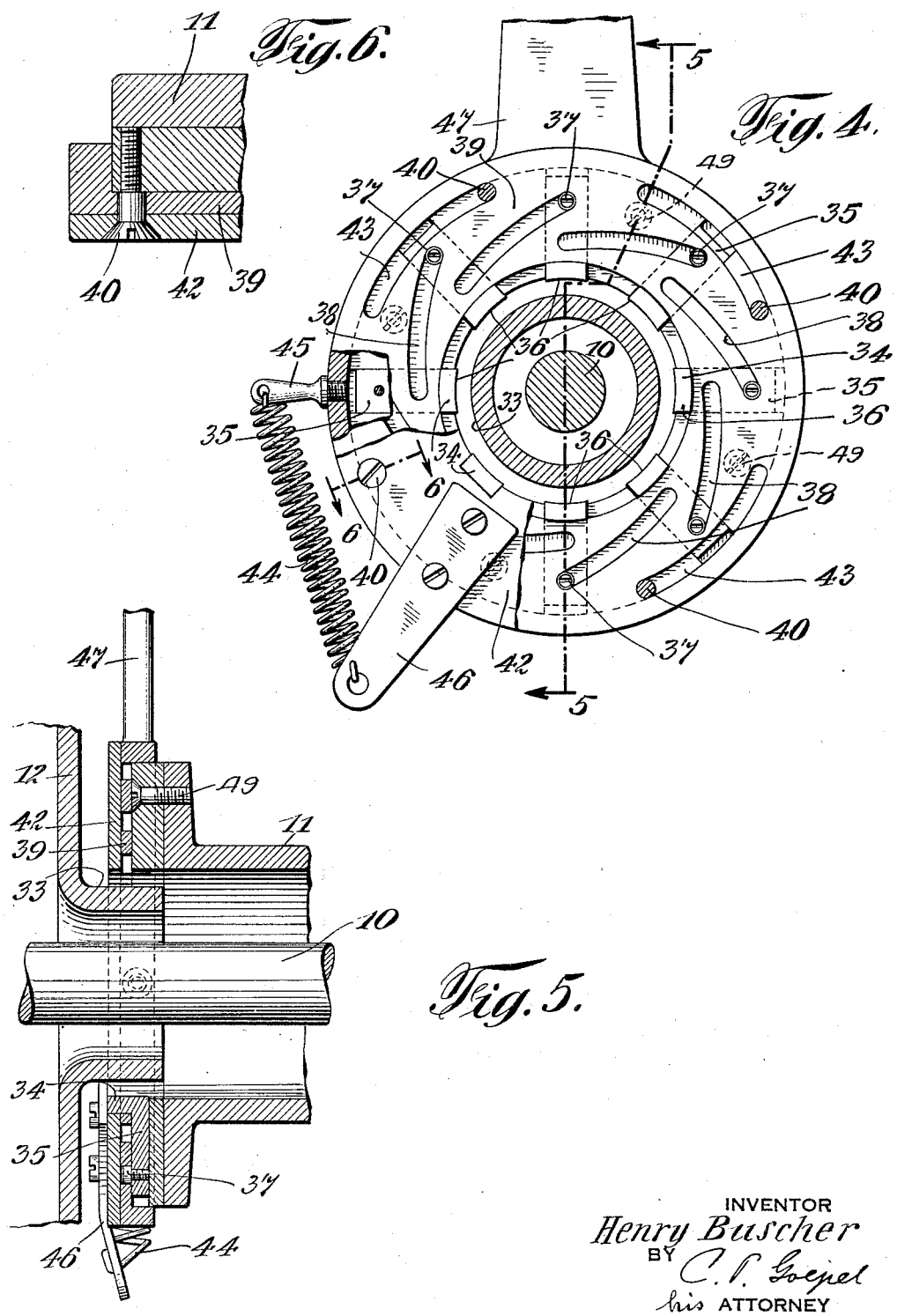

1,853,201

UNITED STATES PATENT OFFICE

HENRY BUSCHER, OF NORTH BERGEN, NEW JERSEY; CATHERINE BUSCHER EXECUTRIX OF SAID HENRY BUSCHER, DECEASED

BRAKE MECHANISM

Application filed May 28, 1929. Serial No. 366,551.

This invention relates to brakes particularly applicable for use in connection with motor vehicles, although not confined to such use; and the invention has for its general object and purpose to provide an improved construction of this character which will be positive in action, strong and rugged in construction, durable in use, and not liable to get out of order.

An object of the invention is to provide a brake construction of the character referred to and in a manner as hereinafter set forth which will be simple in arrangement and assemblage and which will afford a thoroughly satisfactory device for use in motor vehicles, to eliminate the customary brake bands and linings.

The invention has for a main object to provide a circular series of radially arranged brake elements or shoes, mounted and disposed to exert uniform and simultaneous braking action upon a drum, directly and radially thereon, the arrangement including as characterizing features a partially rotatable device with which the brake elements or shoes are connected by anti-friction means and by which they are operated into and out of a position in which to exert braking action on the drum, and retractile means by which automatically to re-position the rotatable device and consequently the brake elements or shoes after each braking action.

Another object of the invention is the provision of a form of construction capable of being produced either as an internal brake wherein the brake elements or shoes are arranged to operate on the concave face of the drum, or as an external brake wherein said elements are arranged to operate on the convex face of the drum.

Other objects and aspects of the invention will appear hereinafter.

The invention consists in the feature of the construction and in the arrangement or arrangements of parts hereinafter fully described and particularly pointed out in the annexed claims.

The invention will be best understood by referring to the accompanying drawings, forming a material part of this application, and in which:—

Figure 1 represents a side elevation of a brake structure made in accordance with the present invention, with the parts thereof constructed and assembled so that the braking action will take place on the inner or concave face of the brake drum;

Figure 2 represents on a larger scale a cross section through the brake structure, this view being taken substantially on the line 2—2 Fig. 3;

Figure 3 represents a section and elevation taken substantially on the line 3—3 Fig. 2;

Figure 4 represents a section and elevation of a structure in which the parts are produced and assembled in a manner to effect the braking action on the outer circumference or convex face of the brake drum;

Figure 5 represents a vertical section taken substantially on the line 5—5 of Fig. 4; and Figure 6 represents an enlarged fragmentary detail taken on the line 6—6 of Fig. 4.

Referring first with more particularity to Figs. 1 to 3, wherein by way of example I have illustrated an internal form of brake construction in association with parts of a motor vehicle, the numeral 10 designates a fragment of the rear axle, 11 the usual stationary housing part which surrounds the axle, and 12 is a brake drum which is fixed to the wheel (not shown) secured to the axle. The frame work of my brake structure comprises a side retaining plate 13, an actuating frame 14, and a holder 15, all of these parts being of circular formation and each of them having about the axle 10 a central opening 16. The actuating frame 14 is arranged between the side plate 13 and holder 15 for partial rotary movement. The means of securing these parts together in order to provide for such partial rotary movement is disclosed as comprising screw connections 17 arranged with their heads countersunk in the side plate and after passing through suitable slots 18, having threaded engagement with the holder, the said slots 18 being concentric with the center of rotation. In order that these parts may be thus secured together so that the actuating frame can be turned freely on the screws 17 to the extent permitted by the slots 18, the screws 17 as best shown in Fig. 2 are formed with shoulders 19 which butt against the inner face of the holder.

The actuating frame has provided therein a series of curved slots 20 obliquely arranged with respect to the center of rotation. In the holder 15 there is provided a series of seats 21 which extend radially with respect to the center of rotation from the outer circumference of the holder to the inner circumference thereof. Said seats 21 being through seats are open at both ends and they are further open at the side adjacent to the actuating frame. The number of seats 21 corresponds with the number of obliquely arranged slots 20. Slidable in each of the seats 21 for radial movement toward and away from the center of rotation is a brake shoe 22 which, in the present embodiment, is formed at its outer end with a brake head 23 designed for frictionally engaging the inner circumference of the brake drum 12 and having for such purpose the outer braking surface 24 made in convex form in order to properly conform with the concave surface of the inner circumference of the brake drum. Each of the slidable elements or brake shoes 22 is provided with a lateral projection in the form of a screw 25 which extends into the corresponding oblique slot 20 and is therein provided with a suitable anti-friction element in the form of a roller 26. With this construction, when rotary movement is imparted to the actuating frame, the sliding elements or shoes 22, owing to the guiding effect of the walls of the curved oblique slots 20 on the roller covered screws 25, are caused to move radially in their seats. The arrangement is such that when the brake heads 23 contact with or approximately contact with the outer circumference 27 of the holder, the roller covered screws 25 will occupy positions at the extreme inner ends of the oblique guide slots 20, that is to say, at the ends which are closer to the center of rotation. When, therefore, the actuating frame is moved circularly, drawing the guide-slots 20 in a direction from their inner ends over the roller screws 25, the brake shoes will be moved radially outwardly so as to bring their brake heads 23 into braking engagement with the inner circumference of the brake drum 12.

For the purpose of imparting circular motion to the actuating frame, an arm 28 is secured at its inner end by means of screws 29 or equivalent means to the actuating frame; and said arm 28 is connected by any approved or customary means with the brake pedal and emergency brake lever of the motor vehicle. For automatically re-positioning the actuating frame and consequently the brake shoes, whereby to move the brake shoes radially inwardly from braking contact with the brake drum, I provide a retractile spring 30, one end of which may be applied as at 31 to the arm 28 and the other end of which may be secured as at 32 to the axle housing 11 or other appropriate stationary part. Under this construction and arrangement, therefore, each time the arm 28 is moved against the tension of the retractile spring 30 whereby to impart circular motion to the actuating frame, all of the brake shoes will be moved radially outwardly into braking engagement with the inner circumference of the brake drum; and, conversely, each time the pull exerted on the arm 28 has been released so that the retractile spring 30 can be called into action, the brake shoes will be moved radially inwardly out of braking contact with the brake drum.

In Figs. 4 to 6, I have disclosed my improved brake structure as it appears when produced for effecting the braking action upon the outer circumference or convex face 33 of the brake drum. In this form of construction the brake heads 34, which are formed at the inner ends of the slidable elements or brake shoes 35, have their outer faces 36 in the direction of the circumference of the brake drum made in concaved form in order properly to conform with the convexity of the outer circumference of the brake drum. In this form of construction also, the construction and arrangement of the parts are such that when the brake shoes are in retracted position the roller covered screws 37 will occupy positions at the outer ends of the guide-slots 38 in the actuating frame 39, that is to say, said roller covered screws will be in the ends of the guide-slots which are the more remote from the center of rotation. In this form of construction, the screws 40, by which the holder 41, actuating frame 39, and side retaining plate 42 are operatively connected, pass through slots 43 in the actuating frame. Said slots 43 are of course concentric with the center of rotation and in the present instance they are shown as located near the outer circumference of the actuating frame at points beyond the curved oblique slots 38. A retractile spring 44, connected between a projection 45 on the actuating frame and a projection 46 on the side plate 42, is placed under tension each time the arm 47 is moved in a direction to cause the brake shoes to be moved radially inwardly into braking engagement with the outer circumferential face 33 of the brake drum. Manifestly, whenever through the release of the pulling power exerted upon the arm 47 the retractile spring 44 is permitted to be called into action, the brake shoes will be drawn radially outwardly from braking engagement with the brake drum. The form of construction illustrated in Figs. 1, 2, and 3 is illustrated as including screw bolts 48 as the means whereby the brake structure is secured to the stationary housing 11, the said screw bolts being applied to connect the side retaining plate 13 directly to the housing.

In the form of construction illustrated in Figs. 4 to 6, the brake structure is shown as connected with the stationary housing 11 by means of screw bolts 49 which connect the side plate directly to the housing 11.

From the foregoing description, taken in connection with the accompanying drawings, it will be evident that I have provided a very simple, practical, and effective brake construction, one in which a plurality of brake shoes are moved simultaneously and uniformly into and out of braking engagement with the brake drum; and it is to be understood that while my improved brake construction is particularly applicable for use in connection with motor vehicles, it is well adapted to be advantageously employed in any connection or capacity where it is desired to exert frictional braking action upon a revoluble part.

While I have thus illustrated and described certain preferred forms of my brake structure, it will be understood that changes and alterations in the details of construction may be made, to which changes and alterations I am entitled, provided the same are effected within the scope of the annexed claims.

I claim:

1. Brake mechanism of the kind described comprising a holder and a retaining plate, an actuating frame therebetween adapted for circular movement and having slots therein concentric with the center of rotation, connections between the holder and retaining plate passing through the slots of the frame and constituting means for limiting the rotation thereof, said frame provided with guide-slots obliquely relatively to the center of rotation, brake elements disposed in the holder for movement radially inwardly and outwardly thereof, and projections on the elements carrying anti-friction devices in the guide-slots whereby circular operation of the frame will cause radial operation of said elements.

2. Brake mechanism of the kind described comprising a circular actuating frame arranged to turn between a holder and a retaining plate, there being curved guide-slots in the frame obliquely relatively to the center of rotation, brake elements disposed in the holder for movement radially inwardly and outwardly thereof, projections on the elements carrying anti-friction devices in the guide-slots whereby circular operation of the frame will cause radial operation of said elements, an operating arm borne by said frame whereby to actuate it in a determinate direction, and a retractile re-positioning spring attached to the frame and adapted to be tensioned when the frame is moved by said arm.

3. In brake mechanism, three adjoining coaxial circular parts having inner openings and comprising an actuating frame arranged to turn between a holder and a retaining plate, there being curved guide-slots in the frame obliquely relatively to the center of rotation, through radial seats in the holder open in adjacency to the frame, brake elements disposed in said seats to slide therein radially inwardly and outwardly and having projections at the open sides of the seats engaging in said guide-slots whereby circular operation of the actuating frame will cause radial operation of the said elements, laterally extending brake heads on said elements at one end thereof, and a flange on the frame encompassing the open ends of said seats remote from said brake heads.

4. In combination, with a brake drum and a stationary part, a holder and a retaining plate connected together and fixed to the stationary part, an actuating frame having lost motion connection between the holder and retaining plate for relative circular movement, there being guide-slots in the actuating frame obliquely relatively to the center of rotation, brake elements disposed in the holder for movement radially towards and away from said brake drum, and projections on said elements engaging in said guide-slots whereby circular operation of the frame will cause radial operation of said elements into and out of a position in which they will have braking action on said brake drum.

5. In combination, with a brake drum and a stationary part, a holder and a retaining plate connected together and fixed to the stationary part, an actuating frame having lost motion connection between the holder and retaining plate for relative circular movement, there being guide-slots in the actuating frame obliquely relatively to the center of rotation, brake elements disposed in the holder for movement radially towards and away from said drum, projections on said elements engaging in said guide-slots, means borne by said frame whereby to actuate it in a determinate direction to move said elements into braking engagement with said drum, and retractile means attached to the frame for re-positioning said frame and elements after each braking action.

6. Brake mechanism comprising, in combination, a holder, a retaining plate, an actuating frame disposed between said parts for circular movement, said frame having guide slots therein curving obliquely relatively to the center of rotation and also having slots therein curving concentric with the center of rotation, elongated brake elements disposed in the holder for lengthwise movement radially inwardly and outwardly thereof, means on the brake elements movable engaging in said guide slots whereby circular operation of the actuating frame will cause radial operation of said brake elements, and connecting members between the holder and retaining plate, passing through said concentric slots and limiting by the extent of said concentric slots the extent of the circular movement of said actuating frame.

In testimony that I claim the foregoing as my invention, I have signed my name hereto.

HENRY BUSCHER.